United States Patent  [11] 3,585,387

[72] Inventor Roland C. Bramlet
 245 West 107th St., New York, N.Y. 10025
[21] Appl. No. 749,480
[22] Filed Aug. 1, 1968
[45] Patented June 15, 1971

[54] RADIATION DETECTION AND IMAGING MACHINE
 10 Claims, 4 Drawing Figs.
[52] U.S. Cl. .................................................. 250/71.5,
 250/105
[51] Int. Cl. ............................................... G01t 1/202
[50] Field of Search ........................................ 250/71.5,
 105

[56] References Cited
UNITED STATES PATENTS
3,011,057 11/1961 Anger .......................... 250/71.5

Primary Examiner—Walter Stolwein
Assistant Examiner—Davis L. Willis
Attorney—Lee C. Robinson, Jr.

ABSTRACT: An apparatus for detecting and for producing an observable image of radiation emitted from a source which includes a rotatable collimator interposed between a detector and the source. In operation, the collimater is rotated during exposure to the source. A preferred detector is a crystal that translates radiation into an optical signal.

PATENTED JUN 15 1971

PATENTED JUN 15 1971 3,585,387

RADIATION DETECTION AND IMAGING MACHINE

The present invention relates to an apparatus and method for detection of radiation emitted from a source and for production of an observable image of the detected radiation.

It is known to introduce a source of radiation, such as a radioactive isotope, into the human body in order to view parts of the body, such as tumors, unobservable by ordinary detection means. The radiation emanating from the body, hereinafter referred to as a radiation source, may be detected and produced into an observable image in a number of conventional ways. The image produced may be mapped out or pictured. One detection and imaging device includes a pickup device for the radiation, such as photographic film. Another detection and imaging device includes a detector, such as a radiation sensitive crystal, or a spark chamber which emits an optical output signal in response to radiation, in combination with a phototube, which may be coupled to a readout or storage device such as an oscilloscope, recording tape, etc. The signal from the detector also may be intensified by a light amplifier tube which sends the intensified signal to a television camera which transmits the signal to a receiver for observation.

To obtain a clear rather than a blurred, pattern of the radiation source, a collimator is interposed between the detector and the radiation source. A collimator of this type customarily comprises a thick block of radiation-opaque material containing a number of elongated collimation channels. The collimator allows radiation traveling only in lines essentially parallel to the channels to pass from the body to the detector. Therefore, each collimator hole accepts radiation only from a position below the hole. Thus, the collimator dissects the radiation pattern to produce an image of the pattern.

One disadvantage of such collimation results from the presence of the "septa," the area between the holes of the collimator, composed of radiation absorbent material. Unless corrected, the radiation from the object will project an image of the collimator superimposed upon the final image of the object, with the result that the accuracy of the reading is impaired. The alternate holes and septa of the collimator may be considered as imparting a spatial carrier frequency to the image which is modulated in spatial fashion by the incident radiation of the object. The result is an amplitude modulated spatial carrier frequency. Unless this carrier frequency is removed, the pattern of holes and septa will appear on the final image.

Another disadvantage of collimation is that the collimator acts as a nonlinear spatial element which may produce unwanted harmonics or spurious beat frequencies between the collimator and the object, thus tending to introduce distortion in the image.

It is an object of the present invention to overcome the disadvantages in prior art collimation.

It is a further object of the present invention to produce an apparatus for the production of an improved image in the detection and imaging of radiation emitted from a source.

Still another object of the invention is to provide new and improved radiation detecting and imaging apparatus which is economical to manufacture and thoroughly reliable in operation.

Other and further objects and advantages of the present invention will be apparent to those skilled in the art from the description which follows of a preferred embodiment of the invention, taken in conjunction with the appended drawings, in which.

Figure 1:
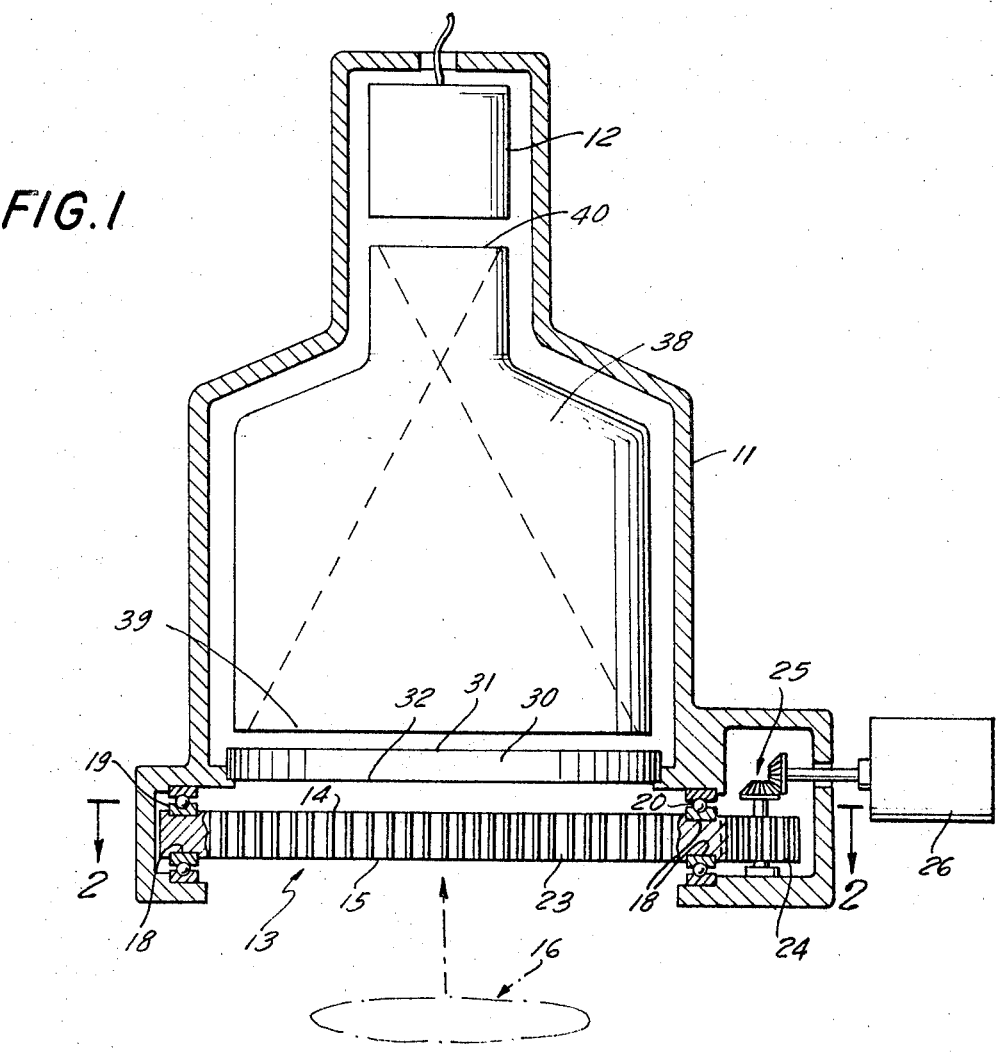
FIG. 1 is a partially cutaway elevational view of an embodiment of the radiation detection and imaging machine of the present invention.
Figure 2:
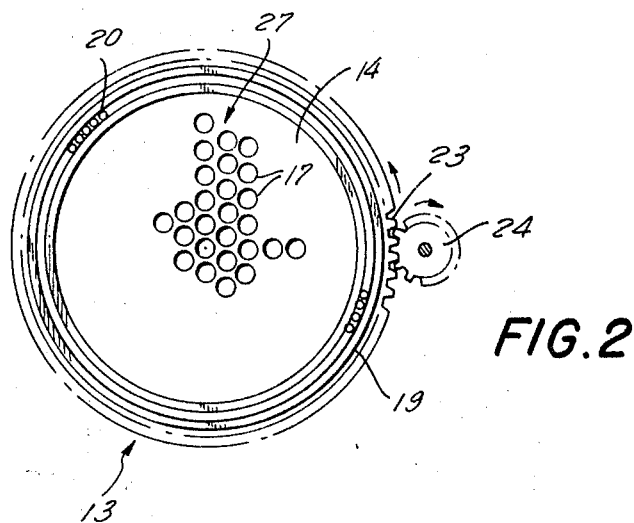
FIG. 2 is a sectional view of certain parts of the apparatus of FIG. 1, taken along the line 2-2 in FIG. 1, showing only a portion of the collimator holes.

Referring to a specific embodiment of the present invention as shown in FIGS. 1 and 2, mounted internally at the upper end of a housing 11 is a cylindrical television camera 12. Rotatably mounted at the other end of the camera 12 is a cylindrical collimator 13 having an upper surface 14 parallel to a lower surface 15. A source of radiation 16 to be mapped out or pictured is positioned adjacent to the collimator surface 15. The source may be gamma rays emitted from a radioactive isotope introduced into a human body for the production of an observable image.

The collimator 13 contains a series of cylindrical channels 17 (which are best shown in FIG. 2). These channels extend throughout the collimator in directions parallel to the collimator axis. The collimator may be composed of a radiation-absorbing material such as lead or tungsten. The walls of the collimator between adjacent channels 17 (FIG. 2) comprise the collimator septa 27. The channels 17 are round parallel holes of uniform diameter and perpendicular to collimator surfaces 14 and 15.

The collimator 13 contains shallow annular grooves 18 near the periphery of surfaces 14 and 15. These grooves accommodate annular raceways 19 for ball bearings 20 upon which the collimator is suspended for rotary motion. The collimator cylindrical periphery contains teeth 23 for meshing with gear 24 which in turn meshes with gear train 25 attached to a synchronous motor 26.

Although in the illustrated embodiment the collimator channels are round parallel holes of uniform diameter, the channels may be square, hexagonal or any other shape. Furthermore, the holes may be tapered, varied in size, or nonparallel.

A thin cylindrical radiation-sensitive crystal 30 is seated within the housing 11 on a shelf. The crystal 30 includes a lower surface 32 which is positioned adjacent and essentially parallel to the collimator upper surface 15. The crystal 30 is comprised of a material capable of translating radiation impinging on its lower surface 32 into visible light emitted from its upper surface 31. In a specific embodiment, the crystal 30 is thalium-activated sodium iodide.

Mounted within housing 11 is an image amplifier tube 38 with its lower surface 39 adjacent to the upper crystal surface 31 and its upper surface 40 adjacent to the television camera 12.

Figure 4:
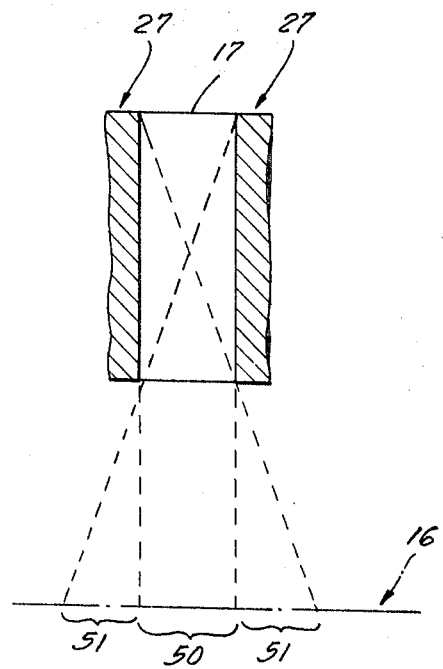
FIG. 4 is a sectional, schematic view of one channel of the collimator and the radiation source.

In operation, radiation, eminating haphazardly in all directions from source 16, image incident upon the lower collimator surface 15. As shown in FIG. 4, with the collimator stationary, only certain radiation may pass through the collimator channels 17. In the umbra area 50 directly below the channel 17, all radiation essentially parallel to the channel passes through the collimator and strikes the crystal lower surface 32 (FIG. 1). FIG. 4 also illustrates the penumbra 51, the outer limit of the area surrounding the umbra from which radiation can pass through channel 17. The stationary collimator 13 dissects the haphazard radiation pattern and sends an image of the pattern to the crystal 30 which translates the radiation into visible light. The image amplifier tube 38 produces a smaller, more intense, picture for pickup by the television camera 12 which transmits the image for observation and recording.

When the described collimation system is stationary, it has all the disadvantages set out earlier in this application. The major disadvantage of the stationary collimator is the image of the collimator septa 27 superimposed on the image produced by the crystal 30.

Unexpectedly, it has been discovered that by rotating the collimator 13 with respect to the crystal 30 through a critical distance during exposure to the radiation source 16, the aforementioned disadvantages of collimation are overcome. The motor 26 operates gear train 25 which in turn rotates gear 24 to drive the collimator 13. During the time that a given image is under observation, the collimator 13 is continuously rotated at a uniform speed. The motion of the collimator 13, relative to the crystal 30, enables all areas of the source 16 to be viewed by the crystal 30. Although not all areas are viewed at any point of time, during a full exposure period radiation from all areas of the source 16 reach the crystal 30 as the collimator channels 17 sweep over areas previously blocked by the collimator septa 27.

Figure 3:
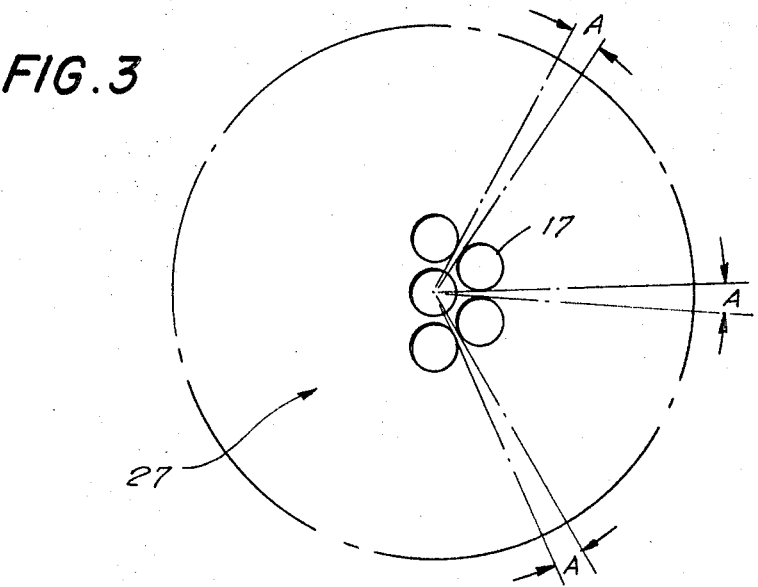
FIG. 3 is a top schematic view of the collimator of the present invention.

It is important that the collimator channel 17 view every portion of the source during exposure. Therefore, the relationship between the geometry of the channels 17 and the rotary motion of the collimator 13 must be coordinated so that all areas blocked by septa 27 are uncovered at least once during the exposure. To insure total exposure for the rotating cylindrical collimator the limiting factor is the holes near the center. As shown in FIG. 3, the angular rotation of the collimator 13 must enable the septa 27, associated with the most central channels 17, to travel through as angle (A) which is sufficient to permit the septa between the adjacent central channels to move a distance equal to their own width during exposure. If the image is to be observed by an operator viewing a receiver tube, the speed of rotation of the collimator must be sufficient for the angular sweep (A) to be repeated at a frequency which exceeds the persistence of vision (approximately 16 cycles per second). Thus, for a full clear picture of the object, the angular sweep (A) must be repeated at least 16 times per second.

The other aforementioned disadvantages of stationary collimation, including the deleterious distortion effects, also are eliminated by rotation of the collimator 13 with respect to the crystal 30. The distortion of the final image resulting from the use of a stationary collimator is caused primarily by the variation in intensity of the incident radiation between the umbra areas 50 (FIG. 4) and the penumbra areas 51. The resulting nonlinearity tends to produce unwanted harmonics and beat frequencies between the radiation source and the collimator which may seriously impair the accuracy of the image. By rotating the collimator at a substantially constant rate, the intensity of the radiation is uniformly distributed over the exposed face of the detector, with the result that deleterious distortion effects are considerably reduced.

The rotation of the collimator 13 about a stationary axis has several important advantages. Among other things, the resulting smooth continuous motion of the holes and septa avoids the need for periodically deactivating the detector or for otherwise compensating for errors introduced because of intermittent or translatory-type motion.

Although a specific embodiment of the detector and imaging system is described, it is to be understood that other systems may be employed. For example, a photographic film may be used without an intermediate amplifying tube for receiving the image directly from the collimator. In other systems, the collimated image may be converted to electrical signals which are transmitted to an oscilloscope or to magnetic tape for recording.

The terms and expressions which have been employed are used as terms of description and not of limitation, and there is no intention in the use of such terms and expressions of excluding any equivalents of the features described or portions thereof, but it is recognized that various modifications are possible within the scope of the invention claimed.

I claim:

1. In combination with an apparatus for the detection and for production of an observable image of radiation emitted from a source, of the type wherein a collimator is interposed between the radiation source and the detector, the improvement which comprises;
   means for rotatably supporting the collimator in juxtaposition with the detector, and
   means for continuously rotating the collimator at a speed sufficient to expose all areas of the source to the detector during the formation of a given image.

2. The combination of claim 1 wherein the detector is a radiation sensitive crystal that emits an optical signal in response to the radiation including, in addition, means for translating the signal into an observable image.

3. Apparatus for detecting and for producing an observable image of radiation from a source, comprising, in combination:
   a detector for receiving radiation from the source;
   collimating means interposed between the source and the detector for directing radiation thereto, said collimating means including a multiplicity of channels in spaced-apart relationship with each other, and the walls of the channels being composed of radiation-opaque material;
   means operatively connected with the detector for generating a signal representative of the received radiation; and
   means for rotating the collimating means relative to the detector at a speed sufficient to move those channels of the collimating means which are closest to the axis of rotation thereof through a distance at least equal to the he spacing between adjacent ones of said closest channels during the detection of the radiation.

4. Apparatus for detecting and for producing an observable image of radiation emitted from a source, comprising, in combination:
   a detector for receiving radiation from the source;
   collimating means interposed between the source and the detector for directing radiation thereto along substantially parallel paths, said collimating means being of cylindrical configuration and including a multiplicity of substantially parallel channels throughout the same in spaced-apart relationship with each other, the walls of the channels being composed of radiation-opaque material;
   means operatively connected with the detector for generating a signal representative of the received radiation; and
   means for continuously rotating the collimating means relative to the detector at a substantially constant speed, said speed being sufficient to move the centermost channels of the collimating means through a distance at least equal to the spacing between adjacent centermost channels during the detection of the radiation.

5. Apparatus for detecting and for producing an observable image of radiation from a source, comprising in combination:
   a detector for receiving radiation from the source;
   collimating means interposed between the source and the detector for directing radiation thereto along substantially parallel paths, said collimating means being of cylindrical configuration and including a multiplicity of substantially parallel channels throughout the same in spaced-apart relationship with each other, and the walls of the channels being composed of radiation-opaque material;
   means operatively connected with the detector for generating a signal representative of the received radiation; and
   means for continuously rotating the collimating means relative to the detector at a substantially constant speed, said speed being sufficient to rotate the centermost channels of the collimating means at least 16 times per second through a distance at least equal to the spacing between adjacent centermost channels.

6. Apparatus for detecting and for producing an observable image of radiation from a source, comprising, in combination:
   a radiation sensitive crystal for translating radiation from the source into visible light;
   collimating means interposed between the source and the crystal for directing radiation thereto along substantially parallel paths, said collimating means being of cylindrical configuration and including a multiplicity of substantially parallel channels throughout the same in spaced-apart relationship with each other, and the walls of the channels being composed of radiation-opaque material;
   means operatively connected with the crystal for generating a signal representative of the received radiation; and
   means for rotating the collimating means relative to the the crystal at a substantially constant speed, said speed being sufficient to move the centermost channels of the collimating means through a distance at least equal to the spacing between adjacent centermost channels during the detection of the radiation, the rotational speed of the collimating means being sufficient to expose all areas of the source to the crystal during the formation of a given image.

7. Apparatus for detecting and for producing an observable image of radiation from a source, comprising, in combination:
a radiation sensitive crystal for translating radiation from the source into a visible image;
means for intensifying the image;
camera means for receiving the intensified image and transmitting the image to a receiver;
collimating means interposed between the source and the crystal for directing radiation thereto along substantially parallel paths, said collimating means being of cylindrical configuration and including a multiplicity of substantially parallel channels throughout the same in spaced-apart relationship with each other, and the walls of the channels being composed of radiation-opaque material;
means operatively connected with the crystal for generating a signal representative of the received radiation; and
means for continuously rotating the collimating means relative to the crystal at a substantially constant speed, said speed being sufficient to move the centermost channels of the collimating means through a distance at least equal to the spacing between adjacent centermost channels during the detection of the radiation, the rotational speed of the collimating means being coordinated with the exposure period of the camera means to expose all areas of the source to the camera means during said period.

8. Apparatus of claim 7 wherein the cylindrical wall of the collimator means is toothed and the rotating means comprises a synchronous motor connected with gear means for meshing with the toothed collimator wall.

9. A method for producing an observable image of radiation from a source, comprising, in combination:
positioning a detector in spaced juxtaposition with the source of radiation;
interposing a collimator having spaced channels between the detector and the source, the radiation from the source passing through the channels to the detector and being detected thereby;
translating the detected radiation into a visible image; and
continuously rotating the collimator relative to the detector at a speed sufficient to expose all areas of the source to the detector during the formation of said image.

10. A method for producing an observable image of radiation from a source, comprising, in combination;
positioning a detector in spaced juxtaposition with the source of radiation;
interposing a collimator having spaced channels between the detector and the source, the radiation from the source passing through the channels to the detector and being detected thereby;
translating the detected radiation into a visible image; and
continuously rotating the collimator relative to the detector at a speed sufficient to expose all areas of the source to the detector during the formation of said image,
the rotational speed of the collimator moving the collimator channels closest to the axis of rotation at least 16 times per second through a distance at least equal to the spacing between said closest channels.